(12) United States Patent
Cai et al.

(10) Patent No.: US 11,588,555 B2
(45) Date of Patent: *Feb. 21, 2023

(54) MONOLITHIC INTEGRATED COHERENT TRANSCEIVER

(71) Applicant: SiFotonics Technologies Co., Ltd., Grand Cayman (KY)

(72) Inventors: Pengfei Cai, Beijing (CN); Zhou Fang, Beijing (CN); Yi Li, Beijing (CN); Ning Zhang, Beijing (CN); Rangchen Yu, San Jose, CA (US); Ching-yin Hong, Lexington, MA (US); Dong Pan, Andover, MA (US)

(73) Assignee: SiFotonics Technologies Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/389,387

(22) Filed: Jul. 30, 2021

(65) Prior Publication Data

US 2021/0359763 A1 Nov. 18, 2021

Related U.S. Application Data

(63) Continuation of application No. 16/843,795, filed on Apr. 8, 2020, now Pat. No. 11,115,125.

(Continued)

(51) Int. Cl.
| | |
|---|---|
| *H04B 10/00* | (2013.01) |
| *H04B 10/40* | (2013.01) |
| *G02B 27/28* | (2006.01) |
| *G02F 1/01* | (2006.01) |
| *G02F 1/21* | (2006.01) |

(Continued)

(52) U.S. Cl.
CPC ........... *H04B 10/40* (2013.01); *G02B 27/283* (2013.01); *G02F 1/0147* (2013.01); *G02F 1/21* (2013.01); *H04B 10/516* (2013.01); *H04B 10/61* (2013.01); *G02F 1/212* (2021.01); *G02F 2203/48* (2013.01); *G02F 2203/50* (2013.01)

(58) Field of Classification Search
CPC ...... H04B 10/40; H04B 10/516; H04B 10/61; G02B 27/283; G02F 1/0147; G02F 1/21
See application file for complete search history.

(56) References Cited

U.S. PATENT DOCUMENTS

| | | | | |
|---|---|---|---|---|
| 8,879,873 | B2 * | 11/2014 | Goh | H04B 10/5053 385/3 |
| 9,461,753 | B2 * | 10/2016 | Takeuchi | H04B 10/614 |

(Continued)

*Primary Examiner* — Pranesh K Barua
(74) *Attorney, Agent, or Firm* — Han IP PLLC; Andy M. Han

(57) ABSTRACT

Various embodiments of a monolithic transceiver are described, which may be fabricated on a semiconductor substrate. The monolithic transceiver includes a coherent receiver module (CRM), a coherent transmitter module (CTM), and a local oscillation splitter to feed a local oscillation to the CRM and the CTM with a tunable power ratio. The monolithic transceiver provides tunable responsivity by employing photodiodes for opto-electrical conversion. The monolithic transceiver also employs a polarization beam rotator-splitter (PBRS) and a polarization beam rotator-combiner (PBRC) for supporting modulation schemes including polarization multiplexed quadrature amplitude modulation (PM-QAM) and polarization multiplexed quadrature phase shift keying (PM-QPSK).

14 Claims, 5 Drawing Sheets

Related U.S. Application Data

(60) Provisional application No. 62/919,999, filed on Apr. 8, 2019.

(51) Int. Cl.
   *H04B 10/61*   (2013.01)
   *H04B 10/516*  (2013.01)

(56) References Cited

U.S. PATENT DOCUMENTS

| | | | |
|---|---|---|---|
| 10,754,091 B1* | 8/2020 | Nagarajan | H04B 10/5053 |
| 2012/0257896 A1* | 10/2012 | Djordjevic | H04B 10/548 |
| | | | 398/65 |
| 2013/0170843 A1* | 7/2013 | Baney | H04B 10/615 |
| | | | 398/212 |
| 2014/0140693 A1* | 5/2014 | Mikhailov | H04B 10/0775 |
| | | | 398/29 |
| 2014/0376930 A1* | 12/2014 | Shiba | H04B 10/61 |
| | | | 398/212 |
| 2016/0041336 A1* | 2/2016 | Doerr | G02F 1/011 |
| | | | 398/135 |
| 2016/0126381 A1* | 5/2016 | Wang | G02B 6/122 |
| | | | 257/429 |
| 2016/0172525 A1* | 6/2016 | Huang | H01L 31/03921 |
| | | | 257/186 |
| 2016/0285561 A1* | 9/2016 | Wu | G02B 6/428 |
| 2017/0012708 A1* | 1/2017 | Saathoff | H04B 10/615 |
| 2017/0104535 A1* | 4/2017 | Hoshida | H04B 10/29 |
| 2017/0195055 A1* | 7/2017 | Evans | H04B 10/616 |
| 2020/0280372 A1* | 9/2020 | Li | H04B 10/54 |

* cited by examiner

MONOLITHIC INTEGRATED COHERENT TRANSCEIVER

CROSS-REFERENCE TO RELATED PATENT APPLICATIONS

The present disclosure is part of a continuation of U.S. patent application Ser. No. 16/843,795, filed 8 Apr. 2020, which claims the priority benefit of U.S. Patent Application No. 62/919,999, filed on Apr. 8, 2019. The aforementioned application is incorporated by reference in its entirety.

TECHNICAL FIELD

The present disclosure relates to the technical field of optical transceivers. More particularly, the present disclosure relates to a monolithic integrated coherent transceiver having various parameter tuning capabilities.

BACKGROUND

Contemporary telecommunication systems involve applications where a large amount of data is transmitted at a high data rate across a fairly long distance, such as long-haul data communication, metro data communication, and communication between data centers. For instance, datacenter interconnection (DCI) applications usually involve transmission of data across a distance of 10-120 kilometers (km), at a data rate of 100 gigabits per second (Gb/s) and beyond. To this end, fiber-based coherent optical communication technologies are often employed. In order to realize the high data rate, a transceiver for coherent optical communication is required to modulate both the amplitude and the phase of an optical carrier to generate an optical signal, as well as demodulate such an optical signal. Moreover, the optical signal is often transmitted across multiple polarizations allowed by the transmission medium, e.g., across both the transverse electric (TE) polarization and the transverse magnetic (TM) polarization of a single-mode fiber.

In addition to the considerably larger amount of data being transmitted and received, contemporary telecommunication systems also require a transceiver to provide various economical and operational benefits such as low cost, low power, and a small footprint. For example, transceivers may be demanded to conform to an Integrated Coherent Transmitter-Receiver Optical Subassembly (IC-TROSA) packaging for long-hual data communications, or a C form-factor pluggable version 2 (CFP2) packaging for metro data communications. For DCI applications, various compact housing form factors have become standards, such as Optical Small Form Pluggable (OSFP), Quad Small Form Pluggable Double Density (QSFP-DD), and Quad Small Form Pluggable Double Density 28 (QSFP28). This in turn requires the optical sub-assemblies (OSAs) inside a transceiver to have very compact sizes. An integrated coherent transmitter and receiver (ICTR) is a good choice of solution. An ICTR is a monolithically integrated optoelectrical chip fabricated on a semiconductor substrate, such as a silicon (Si) or silicon-on-insulator (SOI) substrate, using fabrication techniques similar to those employed in manufacturing semiconductor integrated circuits (ICs). While an ICTR may fulfill requirements of low cost, low power and a small footprint, it also raises various challenges in its design, fabrication and operation that a transceiver made of discrete components does not face.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter. The left-most digit(s) of a reference number identifies the figure in which the reference number first appears. The use of the same reference numbers in different figures indicates similar or identical items.

DETAILED DESCRIPTION OF THE PREFERRED EMBODIMENTS

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

As described above, integrated coherent transmitters and receivers (ICTRs) pose various design, fabrication and operation challenges specific to the monolithically fabricated transceivers. Various parameters need to be tuned for individual transceivers, even for individual components inside a transceiver, to overcome the challenges. In addition, the material system used to fabricate an ICTR needs to be selected strategically. Conventionally, an ICTR is fabricated using a III-V compound material system, such as gallium arsenide (GaAs) or indium phosphide (InP). Albeit their superior electro-optical and opto-electrical properties (e.g., operating bandwidth and responsivity of a photodiode, propagation loss in a waveguide), III-V compound material systems generally have a fabrication cost that is much higher than that of the more mature silicon based complementary-metal-oxide-semiconductor (CMOS) fabrication processes, which have been widely used for manufacturing electrical integrated circuits (ICs). In the present disclosure, a silicon based ICTR fabricated using a CMOS technology is presented. Among the many advantages of the silicon based ICTR, various parameter tuning capabilities are built in for performance optimization. For example, avalanche photodiodes are employed in the silicon based ICTR in place of conventional p-type-intrinsic-n-type (PIN) photodiodes for enhancing the detection sensitivity, extending the operating bandwidth, as well as tuning internal gain for individual photodiodes.

Figure 1:
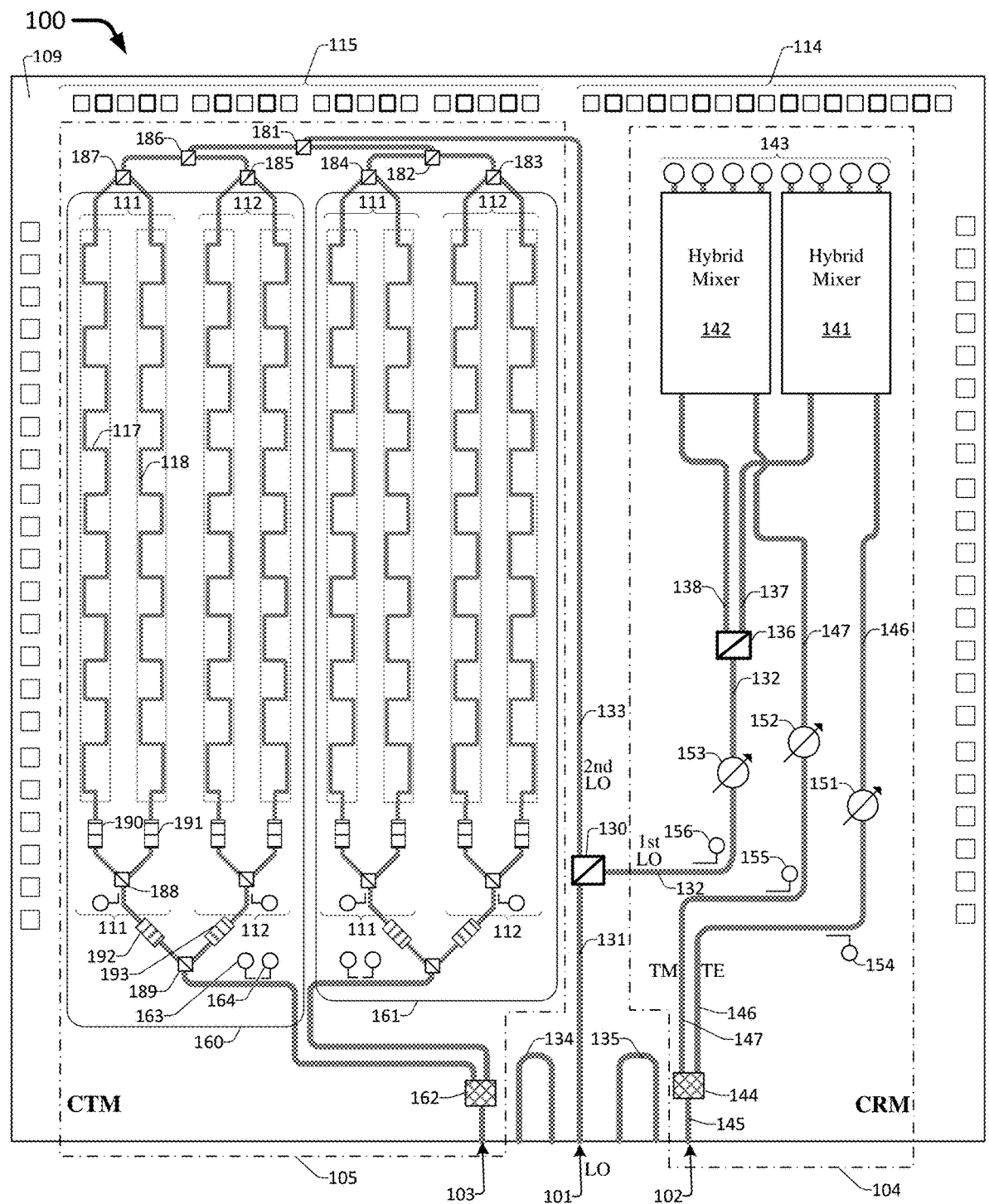
FIG. 1 illustrates a schematic diagram of an integrated coherent transmitter and receiver (ICTR) in accordance with an embodiment of the present disclosure.

FIG. 1 illustrates a schematic diagram of an ICTR 100 fabricated on a monolithic semiconductor substrate 109. The monolithic substrate 109 may be a silicon (Si) substrate or a silicon-on-insulator (SOI) substrate. The ICTR 100 includes a coherent receiver module (CRM) 104 and a coherent transmitter module (CTM) 105. The CRM 104 functions as a receiver of the ICTR 100, capable of extracting information embedded in an optical input received by the ICTR 100 via an input port 102 of the ICTR 100. The optical input is a carrier (e.g., a high-frequency sinusoidal optical wave) modulated by a signal (e.g., a low-frequency analog signal or a low-frequency digital sequence) through a modulation scheme. The information extracted by the CRM 104 is presented in an electrical form, such as electrical voltages or currents presented on a set of electrical pads 114. The CTM 105 functions as a transmitter of the ICTR 100, capable of encoding information into an optical output signal, which is transmitted from the ICTR 100 via an output port 103 of the ICTR 100. The information encoded into the optical output signal may be received electrically by the ICTR 100 via another input port, which may encompass a set of electrical pads 115.

The ICTR 100 also includes a local oscillation (LO) splitter 130. The LO splitter 130 has one input and two outputs. The input of the LO splitter 130 is coupled with an optical waveguide 131, whereas the two outputs of the LO splitter 130 are coupled with optical waveguides 132 and 133, respectively. Each of the optical waveguides 131, 132 and 133 has two opposing ends, and is used to transmit an optical signal between the two opposing ends while the optical signal is substantially confined within the respective waveguide. As shown in FIG. 1, the optical waveguide 131 is used to transmit an optical LO that is received by the ICTR 100 via an input port 101 of the ICTR 100. Similarly, the optical waveguide 132 is used to transmit an optical signal from the LO splitter 130 to the CRM 104, whereas the optical waveguide 133 is used to transmit an optical signal from the LO splitter 130 to the CTM 105.

The optical LO received at the input port 101 may be a sinusoidal optical wave, having a frequency that is substantially equal to the frequency of the carrier of the optical input. The LO splitter 130 splits the optical LO into a first LO and a second LO, with the first LO fed into the waveguide 132 and transmitted to the CRM 104, and the second LO fed into the waveguide 133 and transmitted to the CTM 105. The LO splitter 130 may be programmed to split the optical LO into the first LO and the second LO with a certain splitting ratio between the first LO and the second LO. For example, in an event that it is intended to have equal power of the optical LO going to the CRM 104 and the CTM 105, respectively, the LO splitter 130 may be programmed to split the optical LO such that the splitting ratio is 1:1. Namely, the first LO has half of the total power of the optical LO, whereas the second LO has another half of the total power of the optical LO. As another example, in an event that it is intended to have more of the optical LO power going to the CRM 104 than that going to the CTM 105, the LO splitter 130 may be programmed to split the optical LO such that the splitting ratio is 3:1. Namely, the first LO has 75% of the total power of the optical LO, whereas the second LO has 25% of the total power of the optical LO. Specific mechanisms employed by the LO splitter 130 for setting the splitting ratio are described further below.

In some embodiments, the LO splitter 130 may be a variable ratio optical splitter. That is, the splitting ratio between the first LO traveling to the CRM 104 and the second LO traveling to the CTM 105 can be changed, and in some embodiments can even be tuned or otherwise adjusted dynamically, in a real-time fashion, as the ICTR 100 is operating to receive and/or transmit optical signals. Being a variable ratio optical splitter, the LO splitter 130 provides a parameter tuning capability to optimize performance of the ICTR 100. For example, the LO splitter 130 is able to tune its splitting ratio to allocate more power in the second LO, such that the CTR 105 is able to deliver more output power at the output port 103. As another example, the LO splitter 130 is able to tune its splitting ratio to allocate more power in the first LO, such that the optical input entering the CRM 104 is way above a noise floor of the CRM 104.

The CRM 104 is configured to detect the signal embedded in the modulated carrier of the optical input received via the input port 102. In some embodiments, the carrier is modulated by the signal using a modulation scheme of polarization multiplexed quadrature amplitude modulation (PM-QAM) or polarization multiplexed quadrature phase shift keying (PM-QPSK). The CRM 104 detects the signal by feeding the optical input and the first LO into hybrid mixers (HMs) 141 and 142 thereof. The CRM 104 also includes a polarization beam rotator-splitter (PBRS) 144 to process an optical input that is using a polarization multiplexed modulation scheme before feeding the optical input into HMs 141 and 142. Specifically, a polarization multiplexed optical input carries information in more than one optical polarization. For example, the optical input received at the input port 102 may employ a PM-QAM or PM-QPSK modulation scheme. That is, the optical input includes at least two components, each of which is polarized at a respective optical polarization, such as a transverse electric (TE) component and a transverse magnetic (TM) component. The TE component is a QAM/QPSK-modulated carrier polarized in the TE polarization, whereas the TM component is a QAM/QPSK-modulated carrier polarized in the TM polarization. The PBRS 144 separates the TE component from the TM component so that they can be separately processed by the HM 141 and the HM 142, respectively, to detect the respective signal encoded in the TE and TM components. It is to be noted that, although the TE component and the TM component are polarized differently in the optical input, they would exhibit a same optical polarization after passing the PBRS 144, whereas the signals encoded in the TE and TM components are separated by the PBRS 144 into two optical paths, subsequently processed by the HM 141 and the HM 142, respectively. For instance, before passing the PBRS 144, the TE component traveling in the waveguide 145 is physically having the TE polarization, whereas the TM component traveling in the waveguide 145 is physically having the TM polarization. After passing the PBRS 144, however, the TM component traveling in the waveguide 147 is rotated to be physically in the TE polarization, whereas the TE component traveling in the waveguide 146 remains physically in the TE polarization.

In addition to the LO splitter 130, the CRM 104 has another optical splitter 136, which is used to split the first LO traveling in the waveguide 132 into two branches and feed them to the HMs 141 and 142 via waveguide 137 and 138, respectively. In some embodiments, the optical splitter 136 is a 3 dB coupler, which splits the first LO into the two branches with equal power. Namely, the first LO fed into the HM 141 via the waveguide 137 has the same optical power as the first LO fed into the HM 142 via the waveguide 138. In some embodiments, the optical splitter 136 may be a variable ratio optical splitter, which is capable of programming or otherwise setting a splitting ratio between the first LO traveling to the HM 141 and the first LO traveling to the HM 142 in a way similar to how the LO splitter 130 sets the splitting ratio between the first LO traveling to the CRM 104 and the second LO traveling to the CTM 105. The variable ratio optical splitter 136 provides a parameter tuning capability to optimize performance of the CRM 104. For example, being a variable ratio splitter, the optical splitter 136 is able to tune its splitting ratio to compensate for a systematic offset, if any, between the HM 141 and the HM 142.

More parameter tuning capabilities are built into the CRM 104 by the inclusion of variable optical attenuators (VOAs) 151, 152 and 153, as well as monitoring photodiodes (MPDs) 154, 155 and 156. A VOA is an in-line attenuator, which is capable of providing a programmable attenuation in power for an optical signal passing through the VOA. Namely, the VOAs 151, 152 and 153 provide certain power attenuations to the optical waves traveling in the waveguides 146, 147 and 132, respectively. An MPD is a photodiode connected with an optical coupler. The coupler is used to tap into a waveguide carrying an optical wave by coupling a predetermined small amount of the optical signal to the photodiode. A reading of the photodiode is thus an indication of the power of the optical wave. As shown in FIG. 1, MPDs 154, 155 and 156 are used to monitor a power of the optical wave traveling in the waveguides 146, 147 and 132, respectively. Accordingly, a reading of the MPD 154 provides an indication of the optical power of the TE component of the optical input received via the input port 102. Similarly, a reading of the MPD 155 provides an indication of the optical power of the TM component of the optical input, whereas a reading of the MPD 156 provides an indication of the optical power of the first LO after the first LO is split from the optical LO by the LO splitter 130. According to the readings of the MPDs 154, 155 and 156, one or more of the VOAs 151, 152 and 153 may be tuned to provide certain attenuations to the TE component, the TM component, and the first LO, respectively, so that the HMs 141 and 142 may have substantially equal optical power at their inputs. In some embodiments, the attenuations provided by the VOAs 151, 152 and 153 may be further tuned to compensate for a systematic offset, if any, between the HM 141 and the HM 142.

Each of the HMs 141 and 142, having two inputs and four outputs, is a 90-degree hybrid mixer. A 90-degree hybrid mixer is capable of generating four respectively different beat phase offsets at a 90-degree interval based on the two inputs. Let E1 and E2 denote the optical signals at the two inputs, respectively, and let E3, E4, E5 and E6 denote the optical signals at the two inputs, respectively. The 90-degree hybrid mixer is functionally described using the following equations:

$$E3 = E1 - E2;$$

$$E4 = E1 + E2;$$

$$E5 = E1 - jE2;$$

$$E6 = E1 + jE2.$$

Namely, each of E3, E4, E5 and E6 is a predefined beat phase offset based on E1 and E2. Specifically, E3 is a predefined beat phase offset of 180 degrees based on E1 and E2; E4 is a predefined beat phase offset of 0 degrees based on E1 and E2; E5 is a predefined beat phase offset of −90 degrees based on E1 and E2; and E6 is a predefined beat phase offset of 90 degrees based on E1 and E2. Accordingly, the HM 141 generates at its outputs predefined beat phase offsets of 0 degrees, 180 degrees, 90 degrees and −90 degrees based on the first LO that arrives at the HM 141 via the waveguide 137 and TE component that arrives at the HM 141 via the waveguide 146. Similarly, the HM 142 generates at its outputs predefined beat phase offsets of 0 degrees, 180 degrees, 90 degrees and −90 degrees based on the first LO that arrives at the HM 142 via the waveguide 138 and TM component that arrives at the HM 142 via the waveguide 147. The outputs of the HMs 141 and 142 are coupled to an optical detection array (ODA) 143 that has eight avalanche photodiodes (APDs). That is, each of the four outputs of the HM 141 and the four outputs of the HM 142 is respectively coupled to a corresponding one of the eight APDs of the ODA 143. The APDs of the ODA 143 are used to convert the outputs of the HMs 141 and 142 from an optical form into an electrical form, which may be manifested as electrical voltages or currents presented on the set of electrical pads 114.

The ODA 143 of the ICTR 100 employs APDs instead of conventionally used PIN photodiodes so as to take advantage of the significant internal current gain of the APDs. A PIN photodiode cannot provide an internal current gain. In contrast, thanks to the avalanche mechanism of an APD, the opto-electrical (O-E) responsivity of an APD is significantly higher as compared to that of a PIN photodiode. This translates to a higher O-E responsivity of the ODA 143, and thus a higher sensitivity of the ICTR 100, which is beneficial in that the higher sensitivity of the ICTR 100 relaxes a minimum power requirement of the optical LO as received at the input port 101. The optical LO is generally generated by another optical sub-assembly (OSA), i.e., an integrable tunable laser assembly (ITLA), that is coupled to the input port 101. The high O-E responsivity of the ODA 143 means that the ICTR 100 can work with a less powerful ITLA, which is a huge cost benefit, as a powerful ITLA is typically expensive.

Furthermore, the O-E responsivity of a PIN photodiode is fixed, i.e., the O-E responsivity cannot be tuned or otherwise modified after its fabrication. This poses a challenge for certain wavelengths of the ITLA. For example, while having a reasonable O-E responsivity in the C-band (i.e., the wavelength of the optical LO is in the range of 1530-1565 nm), the conventional PIN photodiodes suffers a degradation in the O-E responsivity when ITLA operates in a longer wavelength range such as L-band (i.e., the wavelength of the optical LO is in the range of 1565-1625 nm). The performance of a transceiver employing PIN photodiodes therefore suffers accordingly. In contrast, the internal current gain of an APD is tunable via a bias voltage applied to the APD. The bias voltage can be tuned to increase the internal current gain of the APD for compensating for any degradation in the O-E responsivity due to the APD operating in different wavelength range. For example, by tuning the bias voltage for the APDs in the ODA 143, any sensitivity degradation of the ICTR 100 when operating in the L-band may be recovered so that the ICTR 100 has comparable sensitivity across C-band and L-band. This is another parameter tuning capability of the ICTR 100.

In some embodiments, the internal current gain for each of the eight APDs of the ODA 143 may be individually programmable by adjusting a respective bias voltage for the APD. This capability to finetune performance of individual APDs of the ODA 143 provides a way to compensate for any random and/or systematic offset that could arise in the fabrication process of the ODA 143. As a result, the eight APDs of the ODA 143 can be tuned to have a better uniformity, which translates to an improved electrical common mode rejection ratio (CMRR) across the eight APDs.

Figure 2:
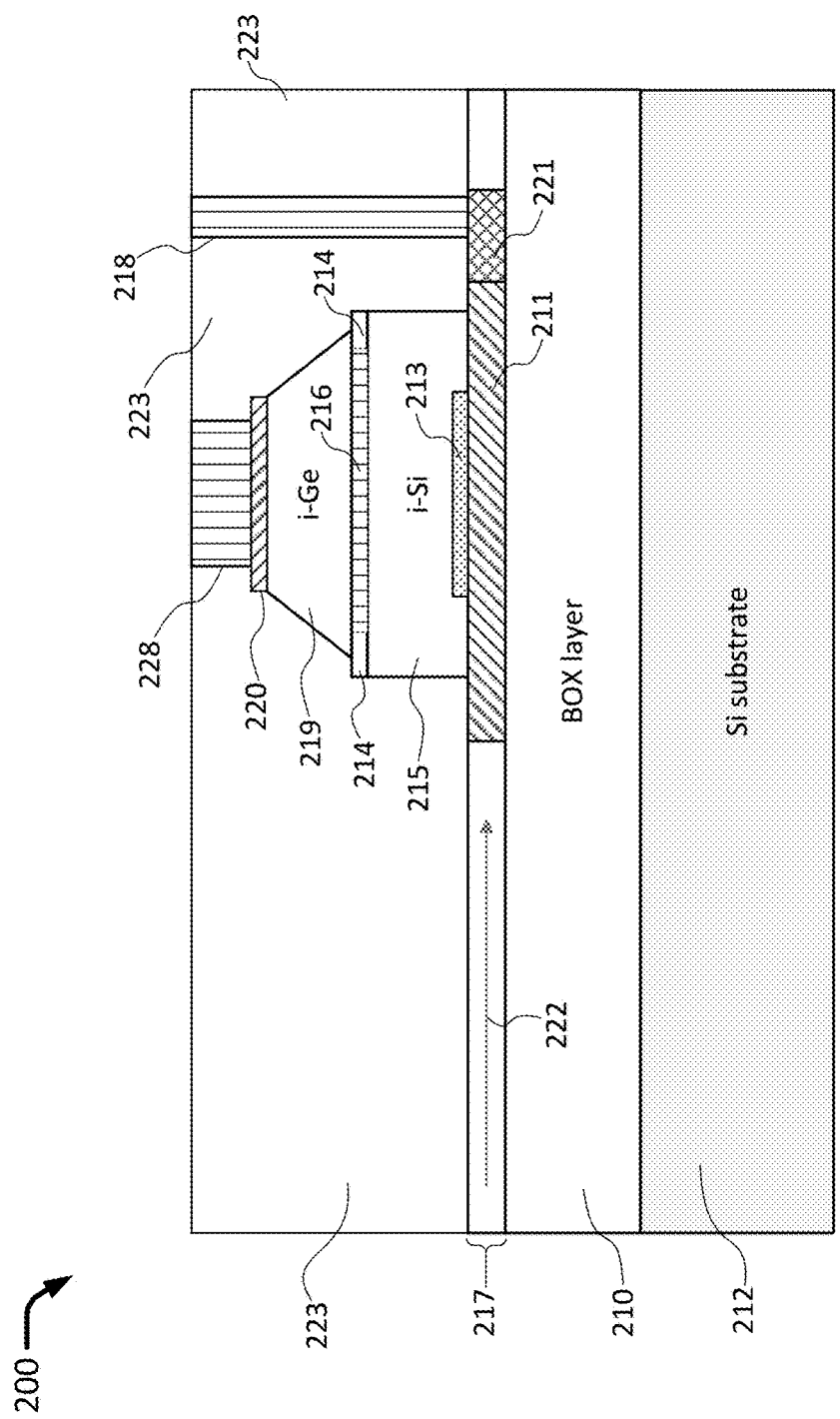
FIG. 2 illustrates a cross-sectional view of a monolithic avalanche photodiode (APD) in accordance with an embodiment of the present disclosure.

FIG. 2 illustrates a cross-sectional view of a monolithic APD 200 that may be employed to realize the APDs of the ODA 143. The APD 200 is fabricated using a CMOS-compatible manufacturing process. Specifically, the manufacturing of the APD 200 starts with a silicon substrate 212. An insulator layer 210, such as a layer of silicon dioxide, is disposed on top of the substrate 212. A bottom contact layer 211 is disposed on top of the insulator layer 210. The bottom contact layer 211 is made of silicon doped with a n-type dopant, such as arsenic (As) or phosphorus (P), at a doping concentration in a range of 5e18-5e19 per cubic centimeter ($cm^{-3}$). The APD 200 further includes a n++ silicon region 221 that is made of silicon doped with the n-type dopant at a doping concentration higher than that of the bottom contact layer 211, and thus provides a satisfactory ohmic contact between an electrical conductor 218 and the bottom contact layer 211. The APD 200 also includes a n-charge layer 213. The n-charge layer 213 is made of silicon doped with the n-type dopant at a doping concentration in a range of 2e17-5e18 $cm^{-3}$.

Additionally, an avalanche layer 215, made of intrinsic silicon, is disposed on top of the bottom contact layer 211. A p-charge layer 216 is disposed on top of the avalanche layer 215. The p-charge layer 216 is made of moderately doped p-type silicon, i.e., silicon doped with a p-type dopant such as boron (B). The p-charge layer 216 is doped at a doping concentration in a range of 8e16-2e18 $cm^{-3}$. In some embodiments, The APD 200 may include a guard ring 214 surrounding the p-charge layer 216. The guard ring 214 is made of silicon doped with the p-type dopant at a doping concentration higher than that of the p-charge layer 216.

Additionally, an absorption layer 219, made of intrinsic germanium, is disposed on top of the p-charge layer 216. A top contact layer 220 is disposed on top of the absorption layer 219. The top contact layer 220 is made of heavily doped p-type amorphous silicon. Specifically, the top contact layer 220 comprises amorphous silicon (a-Si) doped with the p-type dopant at a doping concentration in a range of 5e18-5e19 $cm^{-3}$. An electrical conductor 228 is disposed on top of the top contact layer 220. Finally, a passivation material, such as silicon dioxide, is deposited to form a passivation 223.

Through electrical conductors 218 and 228, a bias voltage may be applied across the top and bottom contact layers 220 and 211 to tune the internal current gain of the APD 200. Specifically, an optical signal 222 traveling in a waveguide 217 couples to the absorption layer 219 by way of evanescent fields. The evanescent fields in the absorption layer 219 thus induce photo-carriers by photon adsorption, which subsequently drift into the avalanche layer 215. The bias voltage applied across the top and bottom contact layers 220 and 211 determines an intensity of an electric field in the avalanche layer 215. The photo-carriers that drift into the avalanche layer 215 are accelerated by the electric field, resulting in an avalanche process that generates a photocurrent as an output of the APD 200. The ratio of resulted photocurrent to the induced photo-carriers is defined as the internal current gain of the APD 200. The higher the bias voltage, the stronger the electric field in the avalanche layer 215, and the larger the internal current gain. Therefore, the internal current gain is programmable by adjusting the bias voltage applied across the top and bottom contact layers 220 and 211.

In some embodiments, APD 200 may be fabricated on an SOI substrate. The insulator layer 210 is realized by a buried oxide (BOX) layer of the SOI substrate, whereas the waveguide 217, the bottom contact layer 211, and the n++ silicon region 221 are formed in a top silicon layer of the SOI substrate.

Figure 3:
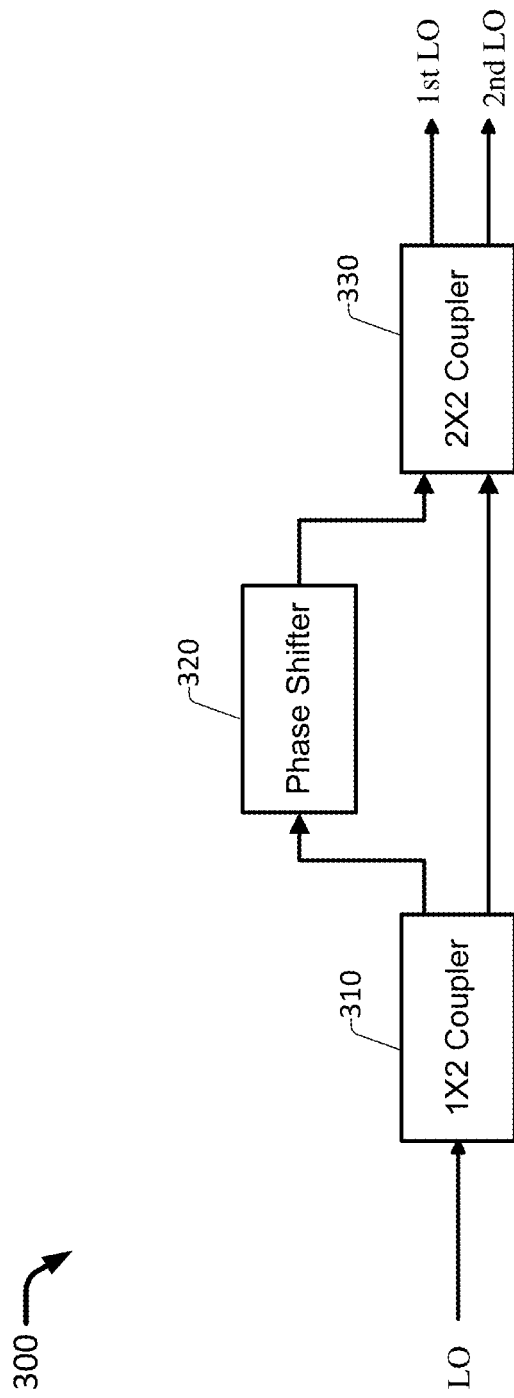
FIG. 3 illustrates a schematic diagram of an optical splitter in accordance with an embodiment of the present disclosure.

FIG. 3 illustrates a schematic diagram of an optical splitter 300 that may be used to realize either or both of the LO splitter 130 and the optical splitter 136. The optical splitter 300 includes a 1×2 optical coupler 310, which has an input, a first output, and a second output. The optical splitter 300 also includes a phase shifter 320, which has an input and an output. The phase shifter 320 is used to provide a phase shift to the optical signal passing the phase shifter 320. In some embodiments, the phase shifter 320 comprises a heater, such as a resistive heating element. An electrical voltage is applied across the heater; an electrical current induced by the electrical voltage heats up the heater and induces the phase shift. The optical splitter 300 further includes a 2×2 optical coupler 330, which has a first input, a second input, a first output, and a second output.

The 1×2 optical coupler 310, the phase shifter 320, and the 2×2 optical coupler 330 are coupled to each other in a Mach-Zehnder interferometer (MZI) configuration. Specifically, the first output of the 1×2 optical coupler 310 is coupled to the input of the phase shifter 320, and the output of the phase shifter 320 is coupled to the first input of the 2×2 optical coupler 330. The second output of the 1×2 optical coupler 310 is coupled to the second input of the 2×2 optical coupler 330. Due to the MZI configuration, the phase shift provided by the phase shifter 320 determines the splitting ratio of an optical signal entering the input of the 1×2 optical coupler 310, as the optical signal is split and presented at the first and second outputs of the 2×2 optical coupler 330.

In some embodiments, the phase shifter 320 is a tunable phase shifter. That is, the electrical voltage applied across the heater of the phase shifter 320 is adjustable. By adjusting the electrical voltage, the phase shifter 320 is able to provide different amount of phase shift, thereby changing the splitting ratio of the optical splitter 300.

In an event that the LO splitter 130 is realized by the optical splitter 300, the 1×2 optical coupler 310 is used to receive the optical LO of FIG. 1 at the input of the 1×2 optical coupler 310. The 2×2 optical coupler 330 is used to generate the first LO of FIG. 1 at the first output of the 2×2 optical coupler 330, as well as the second LO of FIG. 1 at the second output of the 2×2 optical coupler 330. In an event that the phase shifter 320 is a tunable phase shifter, the splitting ratio between the first LO and the second LO is determined by the phase shift provided by the phase shifter 320 based on the tunable electrical voltage applied across the heater of the phase shifter 320.

Figure 4:
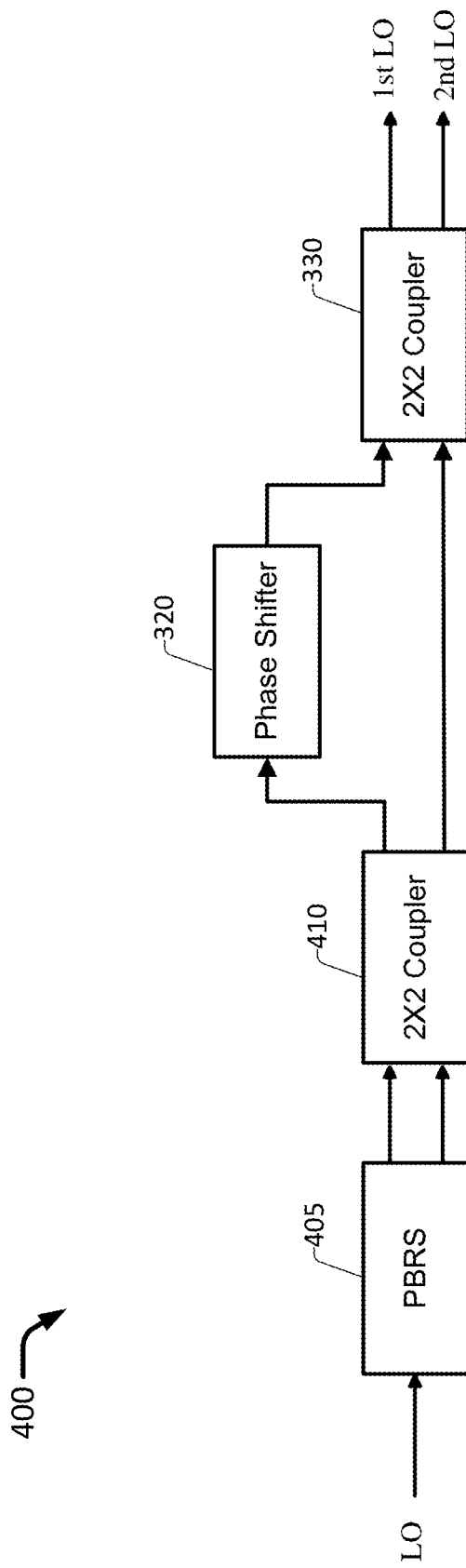
FIG. 4 illustrates a schematic diagram of an optical splitter in accordance with another embodiment of the present disclosure.

FIG. 4 illustrates a schematic diagram of an optical splitter 400 that may be used to realize either or both of the LO splitter 130 and the optical splitter 136. The optical splitter 400 is identical to the optical splitter 300 except that the 1×2 optical coupler 310 is replaced by a combination of a PBRS 405 and a 2×2 optical coupler 410. Specifically, in addition to the phase shifter 320 and the 2×2 optical coupler 330, the optical splitter 400 also includes the PBRS 405, which has an input, a first output, and a second output, as well as the 2×2 optical coupler 410, which has a first input, a second input, a first output, and a second output. As shown in FIG. 4, the 2×2 optical coupler 410, the phase shifter 320, and the 2×2 optical coupler 330 are coupled to each other in an MZI configuration. Specifically, the first output of the first 2×2 optical coupler 410 is coupled to the input of the phase shifter 320. The output of the phase shifter 320 is coupled to the first input of the 2×2 optical coupler 330. The second output of the 2×2 optical coupler 410 is coupled to the second input of the 2×2 optical coupler 330. In addition, the first output of the PBRS 405 is coupled to the first input of the first 2×2 optical coupler 410, whereas the second output of the PBRS 405 is coupled to the second input of the first 2×2 optical coupler 410. Due to the MZI configuration of the optical splitter 400, the phase shift provided by the phase shifter 320 determines the splitting ratio of an optical signal entering the input of the PBRS 405, as the optical signal is split and presented at the first and second outputs of the 2×2 optical coupler 330.

In an event that the LO splitter 130 is realized by the optical splitter 400, the PBRS 405 is used to receive the optical LO of FIG. 1 at the input of the PBRS 405. The 2×2 optical coupler 330 is used to generate the first LO of FIG. 1 at the first output of the 2×2 optical coupler 330, as well as the second LO of FIG. 1 at the second output of the 2×2 optical coupler 330. In an event that the phase shifter 320 of the optical splitter 400 is a tunable phase shifter, the splitting ratio between the first LO and the second LO is determined by the phase shift provided by the phase shifter 320 based on the tunable electrical voltage applied across the heater of the phase shifter 320.

An advantage of using the optical splitter 400 to realize the LO splitter 130, as compared to using the optical splitter 300, resides in that the LO splitter 130 realized by the optical splitter 400 is insensitive to the polarization of the optical LO. In an event that the optical LO propagates in the TM polarization when received at the input port 101 of the ICTR 100, the PBRS 405 is able to rotate the optical LO to the TE polarization and feed the optical LO to both inputs of the 2×2 optical coupler 410 with the TE polarization, resulting in the first LO and the second LO both being correctly polarized in the TE polarization. In contrast, the optical splitter 300 would result in the first LO and the second LO being incorrectly polarized in the TM polarization in an event that the optical LO propagates in the TM polarization when arriving at the input port 101.

Refer back to FIG. 1. As described elsewhere in the present disclosure, the CTM 105 of the ICTR 100 is configured to generate an optical output signal based on the second LO generated by the LO splitter 130, as well as the electrical modulation signal received via the set of electrical pads 115. The electrical modulation signal represents information to be encoded in the optical output signal. In some embodiments, the electrical modulation signal comprises a set of PM-QAM or PM-QPSK signals. The CTM 105 includes two IQ modulators 160 and 161. In an event that the electrical modulation signal comprises a set of PM-QAM or PM-QPSK signals, half of the information represented by the electrical modulation signal is encoded by the IQ modulator 160, whereas the other half of the information is encoded by the IQ modulator 161. Specifically, the IQ modulator 160 is configured to modulate the second LO based on a first half of information represented by the electrical modulation signal, whereas the IQ modulator 161 is configured to modulate the second LO based on a second half of information represented by the electrical modulation signal. The second LO, as modulated by the IQ modulator 160, constitutes a first portion of the optical output signal presented at the output port 103 of the ICTR 100. Similarly, the second LO, as modulated by the IQ modulator 161, constitutes a second portion of the optical output signal. As shown in FIG. 1, preferably, the IQ modulators 160 and 161 are mirrored images of one another in terms of physical layout on the monolithic substrate 109.

The CTM 105 also includes a polarization beam rotator-combiner (PBRC) 162. The PBRC 162 may be identical to the PBRS 130 except that the input and output are reversed. The PBRC 162 is configured to combine the first portion of the optical output signal, as generated by the IQ modulator 160, and the second portion of the optical output signal, as generated by the IQ modulator 161, into the optical output signal presented at the output port 103. Specifically, the first portion of the optical output signal is combined by the PBRC 162 as a TE component of the optical output signal, whereas the second portion of the optical output signal is combined by the PBRC 162 as a TM component of the optical output signal.

Each of the IQ modulators 160 and 161 includes two Mach-Zehnder modulators (MZMs), referred as an I-arm 111 and a Q-arm 112. Preferably, in terms of physical layout on the monolithic substrate 109, the I-arm 111 and the Q-arm 112 are mirrored images of one another, as shown in FIG. 1. Each of the I-arm 111 and the Q-arm 112 has a dual-drive push-pull configuration, wherein the dual-drive push-pull configuration has two serpentine optical paths, such as optical paths 117 and 118. Preferably, in terms of physical layout on the monolithic substrate 109, the two serpentine optical paths 117 and 118 are mirrored images of one another, as shown in FIG. 1.

Accordingly, the CTM 105 has two IQ modulators 160 and 161, each of the two IQ modulators 160 and 161 having two MZMs 111 and 112, each of the two MZMs 111 and 112 having two optical paths each in a form of a serpentine waveguide. This amounts to a total number of eight serpentine optical paths in the CTM 105, as shown in FIG. 1. A plurality of 3 dB couplers, i.e., 3 dB couplers 181, 182, 183, 184, 185, 186 and 187, are included in the CTM 105. The 3 dB couplers 181-187 are connected by optical waveguides in three layers of 1-to-2 configuration so that they collectively distribute the second LO in the waveguide 133 to each of the eight serpentine optical paths of the CTM 105 with substantially identical optical power in each path. Namely, each of the eight serpentine optical paths has ⅛ of the second LO traveling inside.

Each of the two MZMs, i.e., the I-arm 111 and the Q-arm 112, further comprises a 3 dB coupler that is configured to combine the two serpentine optical paths. For example, the I-arm 111 of the IQ modulator 160 has a 3 dB coupler 188 to combine the two serpentine optical paths 117 and 118. Moreover, each of the serpentine optical paths 117 and 118 has an in-line phase tuner. As shown in FIG. 1, the serpentine optical path 117 has an in-line phase tuner 190, whereas the serpentine optical path 118 has an in-line phase tuner 191. In some embodiments, the in-line phase tuners 190 and 191 may be tunable phase shifters, which may be same as or similar to the one used as the tunable phase shifters 320 of FIG. 3 and FIG. 4. The in-line phase tuners 190 and 191 are collectively tuned so that a phase difference between the two serpentine optical paths 117 and 118 is tuned to substantially zero.

In addition to the I-arm 111 and the Q-arm 112, each of the IQ modulators 160 and 161 also includes a 3 dB coupler (e.g., 3 dB coupler 189), an MPD (e.g., MPD 164), as well as an IQ phase tuner (e.g., a combination of in-line phase tuners 192 and 193). The 3 dB coupler is configured to combine an output of the I-arm 111 and an output of the Q-arm 112 into an output of the IQ modulator, referred as "IQ output". The MPD is configured to monitor a power of the IQ output, whereas the IQ phase tuner is configured to tune a phase difference between the I-arm output and the Q-arm output to substantially 90 degrees. The IQ phase tuner, such as the combination of the in-line phase tuners 192 and 193, may include one or more heating elements that can provide a tunable phase shift like how the tunable phase shifters 320 does. The IQ phase tuner is configured to tune the phase difference between the I-arm output and the Q-arm output to substantially 90 degrees based on a reading of the MPD, which indicates the power of the IQ output. For example, the IQ modulator 160 includes, in addition to the I-arm 111 and the Q-arm 112, the 3 dB coupler 189, the MPD 164, as well as the IQ phase tuner comprising the in-line phase tuners 192 and 193. The 3 dB coupler 189 is used to combine the output of the I-arm 111 and the output of the Q-arm 112 into the IQ output of the IQ modulator 160, and the MPD 164 is used to sense or otherwise monitor the IQ output. The in-line phase tuners 192 and 193 are collectively tuned, based on the reading of the IQ output sensed by the MPD 164, to achieve a 90-degree phase difference between the output of the I-arm 111 and the output of the Q-arm 112.

Figure 5:
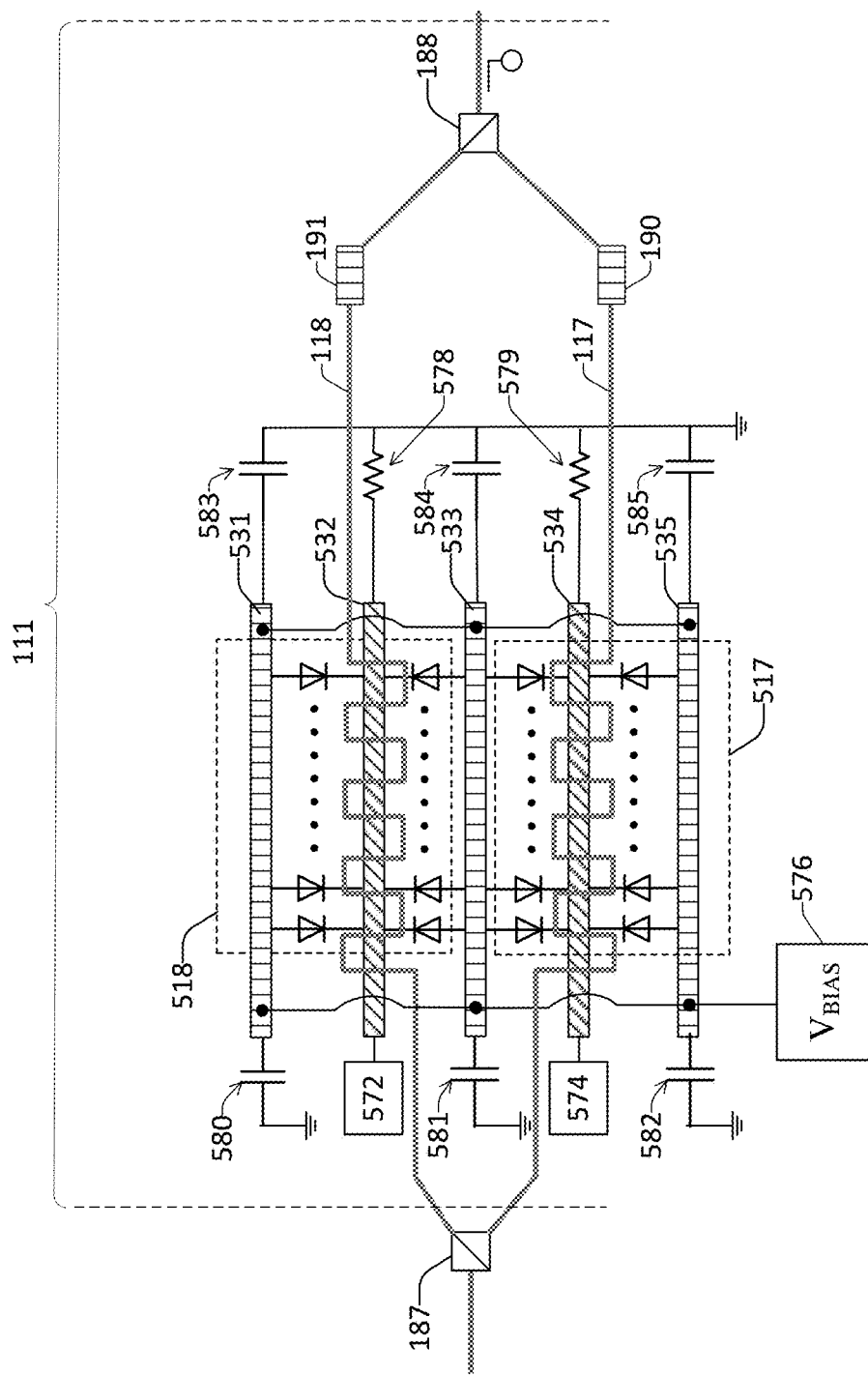
FIG. 5 illustrates a schematic diagram of a portion of an IQ modulator in accordance with an embodiment of the present disclosure.

FIG. 5 illustrates a schematic diagram of a portion of the IQ modulator 160. Specifically, FIG. 5 illustrates a schematic diagram of the I-arm 111 with more details. All MZMs of the CTM 105 share the same schematic details as illustrated in FIG. 5.

As shown in FIG. 5, the serpentine optical path 117 includes a plurality of p-n junction diodes 517. The p-n junction diodes 517 are electrically connected in parallel with each other via electrical connectors 533, 534 and 535, with the electrical connectors 533 and 535 electrically coupled to one another. Moreover, the I-arm 111 includes an electrical pad 576, which is used to receive a direct-current (DC) bias voltage $V_{BIAS}$. The p-n junction diodes 517 are thus reversely biased by the DC bias voltage $V_{BIAS}$. Similarly, the serpentine optical path 118 includes a plurality of p-n junction diodes 518. The p-n junction diodes 518 are electrically connected in parallel with each other via electrical connectors 531, 532 and 533, with the electrical connectors 531 and 533 electrically coupled to one another. The p-n junction diodes 518 are also reversely biased by the DC bias voltage $V_{BIAS}$. The I-arm 111 includes electrical pads 572 and 574. At least a portion of the electrical modulation signal received by the set of electrical pads 115 are DC-coupled to the electrical conductors 532 and 534 via the electrical pads 572 and 574.

Whereas one end of the electrical conductor 532 is coupled to the electrical pad 572, the other end of the electrical conductor 532 is coupled to a load resistor 578. Likewise, one end of the electrical conductor 534 is coupled to the electrical pad 574, whereas the other end of the electrical conductor 534 is coupled to a load resistor 579. In addition, the I-arm 111 includes six decoupling capacitors 580, 581, 582, 583, 584 and 585 for providing decoupling for the DC bias voltage $V_{BIAS}$. Depending on a DC voltage level on the electrical pads 572 and 574, a value of the DC bias voltage $V_{BIAS}$ may be changed accordingly so that the p-n junction diodes 517 and 518 are maintained in a desired reverse bias region for an optimal performance of the MZM 111.

Refer again to FIG. 1. When the ICTR 100 is used in a communication system, the various optical ports of the ICTR 100 have to interface with other OSAs of the communication system. For example, the input port 101 is to be aligned with an optical fiber cable coming from an ITLA. The input port 102 is to be aligned with an optical fiber cable that carries the optical input from possibly another transceiver to the CRM 104. The output port 103 is to be aligned with an optical fiber cable that transmits the optical output from the CTM 105 possibly to yet another transceiver.

Therefore, it is essential for the ICTR 100 to have mechanisms that can ensure satisfactory fiber-to-chip alignment. As shown in FIG. 1, the ICTR 100 includes two U-shaped edge coupler structures 134 and 135, strategically placed at an edge of the substrate 109 at a location close to the optical ports 101, 102 and 103. The U-shaped edge coupler structures 134 and 135 are configured to help fiber-to-chip alignment between the ICTR 100 and a 7-core fiber array that includes a fiber to be aligned with the input port 101 for sending in the optical LO, a fiber to be aligned with the input port 102 for sending in the optical input, a fiber to be aligned with the output port 103 for taking out the optical output, as well as four alignment fibers to be aligned with the U-shaped edge coupler structures 134 and 135 for sending and taking out two optical alignment beacons. In addition, the ICTR 100 employs one or more MPDs to assist fiber-to-chip alignment. For example, the CTM 105 may include an MPD 163. During an alignment procedure of an optical fiber that is intended to be aligned with the ICTR 100 at the output port 103, an alignment signal of a known optical power level may be sent from the optical fiber to the output port 103. The MPD 163 can thus be used to detect the alignment signal entering the ICTR 100 via the output port 103. With the optical power level being a known value, as well as the tap ratio of the optical coupler of the MPD 163, an expected value of the optical power of the alignment signal that is supposed to be detected by the MPD 163 can be calculated or otherwise estimated. A reading of the MPD 163 that is close to the expected value thus indicates a satisfactory alignment between the optical fiber and the output port 103. On the other hand, a reading of the MPD 163 that is significantly less than to the expected value may indicate an unsatisfactory alignment between the optical fiber and the output port 103, The alignment procedure may be repeated until a satisfactory alignment between the optical fiber and the output port 103 is achieved.

In some embodiments, any one of the MPDs of the ICTR 100, such as the MPD 154, the MPD 155, the MPD 156, the MPD 163, or the MPD 164, may include an additional photodiode. That is, any one of the MPDs may have two photodiodes: a main photodiode that is connected with the optical coupler of the MPD, and a "dark" photodiode that is not connected with the optical coupler. The main photodiode receives the optical input of the MPD through the optical coupler and thus generates a photocurrent, whereas the "dark" photodiode does not receive an optical input and thus only generates a dark current but not a photocurrent. Preferably, the main photodiode and the "dark" photodiode are manufactured to be physically identical and within close proximity on the substrate 109, so that the dark current generated by the "dark" photodiode is a close replica of the dark current of the main photodiode. The two photodiodes are configured in a so-called "balanced mode" configuration so that the dark current from the "dark" photodiode is used to calibrate out the dark current of the main photodiode, thereby achieving a higher measurement accuracy of the optical power intended to be monitored by the MPD.

The embodiments described herein provide technical advantages that enable an ICTR having various parameter tuning capabilities, e.g., a tunable gain for individual APDs of the ODA 143, a tunable power of optical input and local oscillation entering the HMs 141 and 142, a tunable splitting ratio of local oscillation between the CRM 104 and CTM 105, and tunable phase difference between various optical paths in the CTM 105. The parameter tuning capabilities of the ICTR as described herein provide useful mechanisms to achieve optimized and more robust performances of the ICTR, such as a wider operating range in terms of wavelength and power, a more uniform responsivity, a higher common-mode rejection as well as a higher tolerance to random noise sources inside the ICTR. The ICTR with parameter tuning capabilities, as described in the present disclosure, enables the optical telecommunication to become more efficient and cost effective.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A monolithic coherent transceiver, comprising:
    a first input port to receive an optical input, the optical input comprising a carrier modulated by a signal through a modulation scheme;
    a second input port to receive an optical local oscillation (LO), a frequency of the optical LO substantially equal to a frequency of the carrier;
    a LO splitter to split the optical LO into a first LO and a second LO with a splitting ratio between the first LO and the second LO;
    a coherent receiver module (CRM) to detect the signal based on the optical input and the first LO;
    a third input port to receive an electrical modulation signal;
    a coherent transmitter module (CTM) to generate an optical output signal based on the second LO and the electrical modulation signal; and
    an output port to transmit the optical output signal,
    wherein the modulation scheme comprises polarization multiplexed quadrature amplitude modulation (PM-QAM) or polarization multiplexed quadrature phase shift keying (PM-QPSK),
    wherein the LO splitter comprises:
        a 1×2 optical coupler having an input, a first output and a second output;
        a tunable phase shifter having an input and an output, the tunable phase shifter configured to provide a phase shift based on an electrical voltage; and
        a 2×2 optical coupler having a first input, a second input, a first output and a second output, and wherein:
the 1×2 optical coupler is configured to receive the optical LO at the input of the 1×2 optical coupler,
the first output of the 1×2 optical coupler is coupled to the input of the tunable phase shifter,
the output of the tunable phase shifter is coupled to the first input of the 2×2 optical coupler,
the second output of the 1×2 optical coupler is coupled to the second input of the 2×2 optical coupler,
the 2×2 optical coupler is configured to generate the first LO at the first output of the 2×2 optical coupler,
the 2×2 optical coupler is further configured to generate the second LO at the second output of the 2×2 optical coupler, and
the splitting ratio between the first LO and the second LO is determined by the phase shift based on the electrical voltage,
wherein the optical input comprises a transverse electric (TE) component and a transverse magnetic (TM) component,
wherein the CRM comprises a polarization beam rotator-splitter (PBRS) to separate the TE component from the TM component,
wherein the CRM further comprises:
an optical detection array (ODA) comprising a plurality of photodiodes;
a first hybrid mixer having two inputs and four outputs, the two inputs of the first hybrid mixer respectively coupled to the TE component and the first LO, each of the four outputs of the first hybrid mixer respectively coupled to a corresponding photodiode of the ODA; and
a second hybrid mixer having two inputs and four outputs, the two inputs of the second hybrid mixer respectively coupled to the TM component and the first LO, each of the four outputs of the second hybrid mixer respectively coupled to a corresponding photodiode of the ODA, and
wherein an internal current gain of each of the plurality of photodiodes is programmable by adjusting a respective bias voltage applied to the photodiode.

2. The monolithic coherent transceiver of claim 1, wherein each of the plurality of photodiodes comprises:
a substrate comprising silicon;
an insulator layer disposed on top of the substrate, the insulator layer comprising silicon dioxide;
a bottom contact layer disposed on top of the insulator layer, the bottom contact layer comprising heavily doped n-type silicon;
an avalanche layer disposed on top of the bottom contact layer, the avalanche layer comprising intrinsic silicon;
a p-charge layer disposed on top of the avalanche layer, the p-charge layer comprising moderately doped p-type silicon;
an absorption layer disposed on top of the p-charge layer, the absorption layer comprising intrinsic germanium; and
a top contact layer disposed on top of the absorption layer, the top contact layer comprising heavily doped p-type amorphous silicon.

3. The monolithic coherent transceiver of claim 2, wherein:
the bottom contact layer comprises silicon doped by a n-type dopant with a doping concentration in a range of 5e18-5e19 per cubic centimeter (cm-3),
the p-charge layer comprises silicon doped by a p-type dopant with a doping concentration in a range of 8e16-2e18 cm-3,
the top contact layer comprises amorphous silicon doped by the p-type dopant with a doping concentration in a range of 5e18-5e19 cm-3,
the n-type dopant comprises arsenic or phosphorus, and
the p-type dopant comprises boron.

4. The monolithic coherent transceiver of claim 1, wherein an internal current gain of each of the plurality of photodiodes is programmable by adjusting a respective bias voltage applied across the photodiode.

5. The monolithic coherent transceiver of claim 1, wherein the CRM further comprises:
a first variable optical attenuator (VOA) capable of adjusting a power of the first LO before the first LO is coupled to each of the first hybrid mixer and the second hybrid mixer;
a second VOA capable of adjusting a power of the TE component before the TE component is coupled to the first hybrid mixer; and
a third VOA capable of adjusting a power of the TM component before the TM component is coupled to the second hybrid mixer.

6. The monolithic coherent transceiver of claim 1, wherein the CRM further comprises:
a first monitoring photodiode (MPD) to monitor a power of the first LO;
a second MPD to monitor a power of the TE component; and
a third MPD to monitor a power of the TM component.

7. The monolithic coherent transceiver of claim 1, wherein the electrical modulation signal comprises a set of PM-QAM or PM-QPSK signals, and wherein at least a portion of the electrical modulation signal are direct-current-coupled to the first MZM and the second MZM of the coherent transmitter module.

8. A monolithic coherent transceiver, comprising:
a first input port to receive an optical input, the optical input comprising a carrier modulated by a signal through a modulation scheme;
a second input port to receive an optical local oscillation (LO), a frequency of the optical LO substantially equal to a frequency of the carrier;
a LO splitter to split the optical LO into a first LO and a second LO with a splitting ratio between the first LO and the second LO;
a coherent receiver module (CRM) to detect the signal based on the optical input and the first LO;
a third input port to receive an electrical modulation signal;
a coherent transmitter module (CTM) to generate an optical output signal based on the second LO and the electrical modulation signal; and
an output port to transmit the optical output signal,
wherein the modulation scheme comprises polarization multiplexed quadrature amplitude modulation (PM-QAM) or polarization multiplexed quadrature phase shift keying (PM-QPSK),
wherein the LO splitter comprises:
a polarization beam rotator-splitter (PBRS) having an input, a first output and a second output;
a first 2×2 optical coupler having a first input, a second input, a first output and a second output;
a tunable phase shifter having an input and an output, the tunable phase shifter configured to provide a phase shift based on an electrical voltage; and a second 2×2 optical coupler having a first input, a second input, a first output and a second output, and wherein:

the PBRS is configured to receive the optical LO at the input of the PBRS, the first output of the PBRS is coupled to the first input of the first 2×2 optical coupler, the second output of the PBRS is coupled to the second input of the first 2×2 optical coupler, the first output of the first 2×2 optical coupler is coupled to the input of the tunable phase shifter, the output of the tunable phase shifter is coupled to the first input of the second 2×2 optical coupler, the second output of the first 2×2 optical coupler is coupled to the second input of the second 2×2 optical coupler, the second 2×2 optical coupler is configured to generate the first LO at the first output of the second 2×2 optical coupler, the second 2×2 optical coupler is further configured to generate the second LO at the second output of the second 2×2 optical coupler, and the splitting ratio between the first LO and the second LO is determined by the phase shift based on the electrical voltage, wherein the optical input comprises a transverse electric (TE) component and a transverse magnetic (TM) component, wherein the CRM comprises a polarization beam rotator-splitter (PBRS) to separate the TE component from the TM component, wherein the CRM further comprises:

an optical detection array (ODA) comprising a plurality of photodiodes;

a first hybrid mixer having two inputs and four outputs, the two inputs of the first hybrid mixer respectively coupled to the TE component and the first LO, each of the four outputs of the first hybrid mixer respectively coupled to a corresponding photodiode of the ODA; and a second hybrid mixer having two inputs and four outputs, the two inputs of the second hybrid mixer respectively coupled to the TM component and the first LO, each of the four outputs of the second hybrid mixer respectively coupled to a corresponding photodiode of the ODA, and wherein an internal current gain of each of the plurality of photodiodes is programmable by adjusting a respective bias voltage applied to the photodiode.

9. The monolithic coherent transceiver of claim 8, wherein each of the plurality of photodiodes comprises:

a substrate comprising silicon;

an insulator layer disposed on top of the substrate, the insulator layer comprising silicon dioxide;

a bottom contact layer disposed on top of the insulator layer, the bottom contact layer comprising heavily doped n-type silicon;

an avalanche layer disposed on top of the bottom contact layer, the avalanche layer comprising intrinsic silicon;

a p-charge layer disposed on top of the avalanche layer, the p-charge layer comprising moderately doped p-type silicon;

an absorption layer disposed on top of the p-charge layer, the absorption layer comprising intrinsic germanium; and a top contact layer disposed on top of the absorption layer, the top contact layer comprising heavily doped p-type amorphous silicon.

10. The monolithic coherent transceiver of claim 9, wherein:

the bottom contact layer comprises silicon doped by a n-type dopant with a doping concentration in a range of 5e18-5e19 per cubic centimeter (cm-3), the p-charge layer comprises silicon doped by a p-type dopant with a doping concentration in a range of 8e16-2e18 cm-3, the top contact layer comprises amorphous silicon doped by the p-type dopant with a doping concentration in a range of 5e18-5e19 cm-3, the n-type dopant comprises arsenic or phosphorus, and the p-type dopant comprises boron.

11. The monolithic coherent transceiver of claim 8, wherein an internal current gain of each of the plurality of photodiodes is programmable by adjusting a respective bias voltage applied across the photodiode.

12. The monolithic coherent transceiver of claim 8, wherein the CRM further comprises:

a first variable optical attenuator (VOA) capable of adjusting a power of the first LO before the first LO is coupled to each of the first hybrid mixer and the second hybrid mixer;

a second VOA capable of adjusting a power of the TE component before the TE component is coupled to the first hybrid mixer; and a third VOA capable of adjusting a power of the TM component before the TM component is coupled to the second hybrid mixer.

13. The monolithic coherent transceiver of claim 8, wherein the CRM further comprises:

a first monitoring photodiode (MPD) to monitor a power of the first LO;

a second MPD to monitor a power of the TE component; and a third MPD to monitor a power of the TM component.

14. The monolithic coherent transceiver of claim 8, wherein the electrical modulation signal comprises a set of PM-QAM or PM-QPSK signals, and wherein at least a portion of the electrical modulation signal are direct-current-coupled to the first MZM and the second MZM of the coherent transmitter module.

\* \* \* \* \*